(12) United States Patent
Moore (10) Patent No.: US 6,595,714 B2
(45) Date of Patent: Jul. 22, 2003

(54) SWIVEL INSERT FOR A CONTROL ROD

(75) Inventor: Daniel Lee Moore, Edmonds, WA (US)

(73) Assignee: Tyee Aircraft, Everett, WA (US)

( * ) Notice: Subject to any disclaimer, the term of this patent is extended or adjusted under 35 U.S.C. 154(b) by 0 days.

(21) Appl. No.: 09/733,893

(22) Filed: Dec. 9, 2000

(65) Prior Publication Data

US 2002/0071719 A1 Jun. 13, 2002

(51) Int. Cl.[7] .............................. F16B 21/00; F16B 2/16
(52) U.S. Cl. ..................... 403/322.2; 403/165; 403/315
(58) Field of Search .............................. 403/322.2, 108, 403/315, 355, 286, 165; 280/86–757

(56) References Cited

U.S. PATENT DOCUMENTS

| | | | | |
|---|---|---|---|---|
| 2,906,311 A | * | 9/1959 | Boyd | 411/105 |
| 3,180,390 A | * | 4/1965 | Ockert, Jr. | 411/348 |
| 4,016,914 A | * | 4/1977 | Zurko | 411/105 |
| 4,016,941 A | * | 4/1977 | Sanders | 173/170 |
| 4,097,163 A | | 6/1978 | Dubuque | 403/274 |
| 4,681,495 A | * | 7/1987 | Crespin et al. | 411/298 |

* cited by examiner

Primary Examiner—Lynne H. Browne
Assistant Examiner—Ernesto Garcia
(74) Attorney, Agent, or Firm—Christie, Parker & Hale, LLP (57) ABSTRACT

A control rod for an aircraft actuator system. The control rod incorporates a swivel insert to create a rotatably connected rod end. The swivel insert comprises a longitudinal bore for introduction of a rod end shaft. The rod end shaft has a circumferential groove that aligns with radially extending bores in a threaded portion of the swivel insert. Ball bearings are placed into the radially extending bores and the swivel insert is threaded into a tube having an internally threaded bore and a counter bored entrance portion. Once the swivel insert is threaded into place, the ball bearings are captured in the radially extending bores between the counter bored entrance portion of the tube and the circumferential groove. The rod end is thus free to rotate but is rotatably attached to the control rod.

12 Claims, 9 Drawing Sheets

SWIVEL INSERT FOR A CONTROL ROD

BACKGROUND OF THE INVENTION

The present invention relates generally to control rods used in aircraft actuator systems and more particularly to providing control rods with rotating rod ends.

Actuator systems are used within an aircraft to transmit a pilot's control inputs from controls in a cockpit to control surfaces on the exterior of the aircraft such as elevators, ailerons, and rudders. In some applications, the relative motion between connected elements within an actuator system may have more than one degree of freedom. For example, an element may rotate in relation to its connected element as a linear force is being transferred from one element to the other. In this case, construction of the actuator system requires the use of a control rod connecting the element wherein one rod end of the control rod is free to rotate.

Therefore, a need exists for a method to integrate a rotating rod end with a control rod in a cost effective way. Preferably the integration method should be adaptable to many different kinds of control rod and rod end configurations. The present invention meets such need.

SUMMARY OF THE INVENTION

It is an object of the invention to provide a control rod for an aircraft actuator system with a rotatably connected rod end. The connection between the control rod and the rod end is preferably strong, simple to construct, and light weight.

The control rod for an aircraft actuator system comprises a swivel insert, a rod end, and a tube. The swivel insert includes a tubular member having a longitudinally extending bore, external screw threads, and at least one radially extending bore through the tubular member. The rod end includes a shaft with the shaft including a circumferential groove. The tube includes an internally threaded bore such that the tube can be connected to the swivel insert. The shaft of the rod end is located in the longitudinally extending bore of the swivel insert with the radially extending bore and circumferential groove substantially aligned. A ball bearing is placed in the radially extending bore and rests in the circumferential groove. The tube is threadedly coupled to the swivel insert with the ball bearing captured substantially within the radially extending bore between circumferential groove and the tube creating a rod end rotatably connected to the control rod.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Control rods are elements used in actuator systems to transfer forces and loads between components within an actuator system. For example, control rods are often used to transfer control inputs from a pilot into the actuator system. In some applications, a control rod may require a swiveling rod end. For example, the relative motion between attachment points on attached elements within an actuator system may contain a rotational component. In this case, having a control rod with a swiveling rod end allows the control rod to compensate for the rotational component of the relative motion between the attachment points of the actuator elements as the control rod transfers force between the actuator elements.

Figure 1:
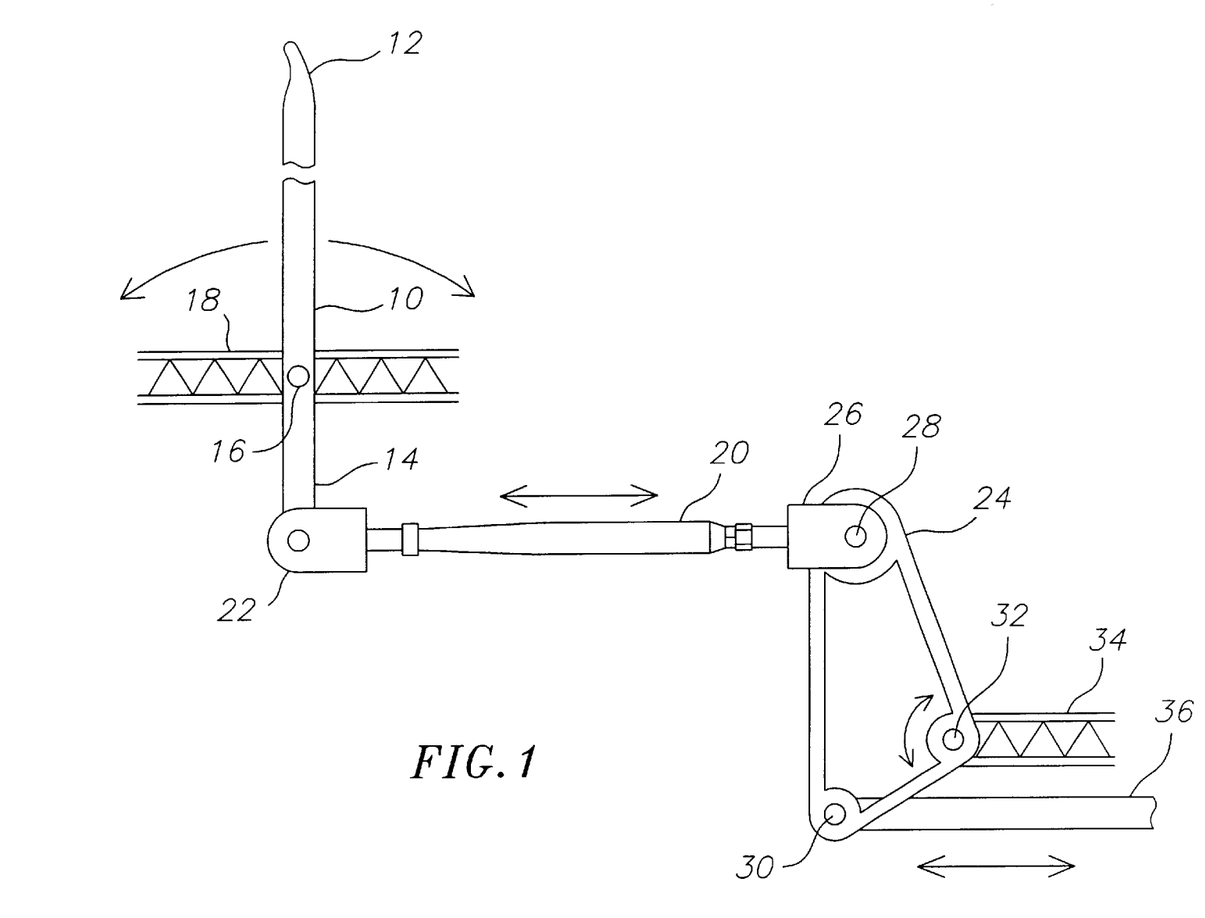
FIG. 1 is an illustration of using a control rod with a rotatably connected rod end of the present invention in an aircraft control linkage.

FIG. 1 is an illustration of using a control rod with a swivel insert of the present invention in an aircraft control linkage. Control lever 10 comprises top end 12, bottom end 14, and control lever pivot attachment point 16 located between the top end and the bottom end. The control lever is pivotally attached to first fixed member 18 at the control lever pivot attachment point within an aircraft. The control lever is moveably attached at the bottom end to first control rod 20 with a swivel insert at first control rod end 22. The control rod is moveably attached to control arm 24 at second control rod end 26. The control arm comprises a control arm top attachment point 28, a control arm bottom attachment point 30, and a control arm pivot attachment point 32. The control arm is pivotally attached at the control arm pivot attachment point to second fixed member 34 within the aircraft. The control arm is moveably attached to second control rod 36 at the control arm bottom attachment point.

Application of a control input force to top end 12 of control lever 10 causes the control lever to pivot about control lever pivot attachment point 16 at first fixed member 18. This pivoting motion transfers the control input force to control arm 24 through first control rod 20 attached to bottom end 14 of the control lever. The control input force causes the control arm to pivot about control arm pivot attachment point 32. During the control arm's pivoting motion, the control arm rotates slightly introducing a rotational component to the relative motion between the control arm and the control lever. The control rod end rotates in response to the rotational moment effectively absorbing the rotational moment without imposing a strain in the actuator system. The control arm then transfers the control input force to the second control rod 36.

Figure 2:
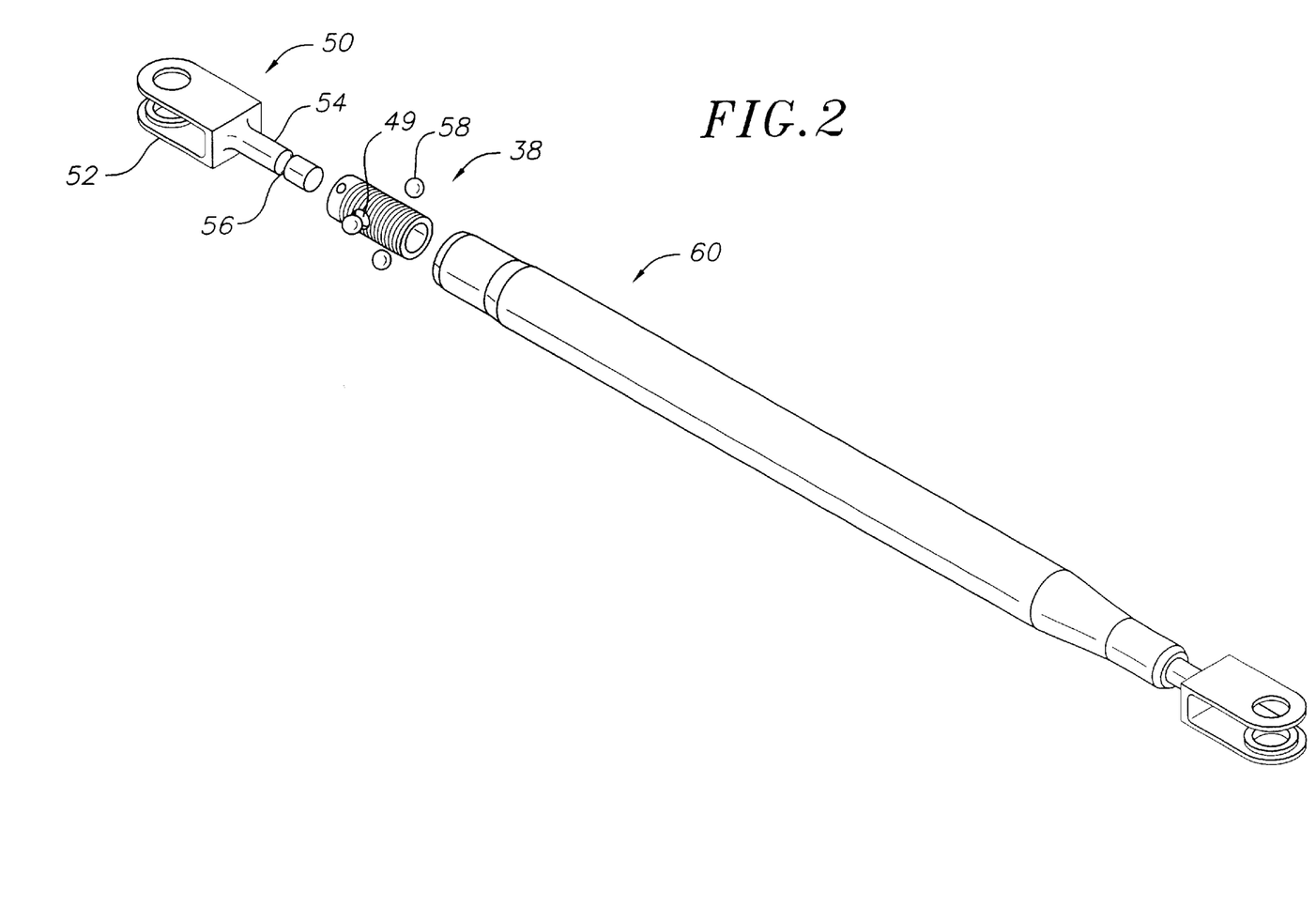
FIG. 2 is an exploded view of a control rod with a rotating rod end and a swivel insert

FIG. 2 is an exploded view of a control rod employing a swivel insert. Rod end 50 is comprised of a shaft 54 and a connection end 52. The shaft includes a circumferential groove 56. The shaft is inserted into a swivel insert 38 until the circumferential groove is in substantial alignment with a radially extending bore 49. A ball bearing 58 is placed in the radially extending bore 49 and substantially fills the radially extending bore 49 of the swivel insert, resting in the circumferential groove of the shaft. The swivel insert is threaded into internally threaded bore 62 (FIG. 6) of tube 60.

Figure 3:
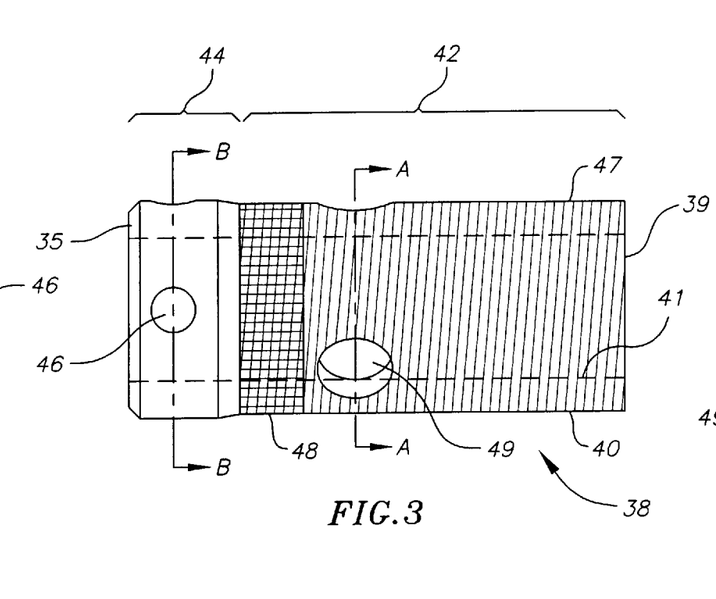
FIG. 3 is a side view of a swivel insert for a control rod.

FIG. 3 is a side view of a preferred embodiment of a swivel insert for a control rod. A swivel insert 38 includes a tubular member 35 having a longitudinally extending bore 39 terminating in openings at opposite ends of the swivel insert, an external surface 40, and an internal surface 41. The swivel insert is preferably composed of a hard material such as a metallic alloy including aluminum, nickel, and bronze.

The external surface includes a threaded portion 42 and a non-threaded portion 44. Threaded portion 42 of external surface 40 of swivel insert 38 has screw threads 47 having a major diameter and a minor diameter. The screw threads extend from one end of the threaded portion along the length of the threaded portion towards the non-threaded portion. The screw threads terminate in at least one row of longitudinally extending grooves 48 next to the non-threaded portion. The longitudinally extending grooves are preferably disposed so as not to be parallel to any turning moment tending to rotate the swivel insert relative to any threaded element receiving the external threaded portion of the swivel insert. The threaded length of the threaded portion is commensurate with the intended maximum force to be applied to a control rod comprising the swivel insert.

Figure 4:
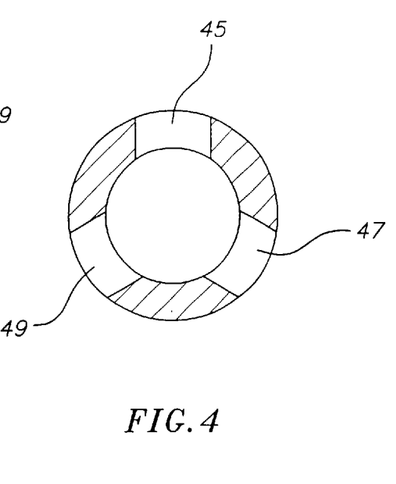
FIG. 4 is a cross-sectional view of a threaded portion of a swivel insert.

At least one radially extending bore 49 is located within the area of the threaded portion between the longitudinally extending grooves and an end of the swivel insert. The radially extending bore extends from external surface 40 and terminates at internal surface 41. FIG. 4 is a cross-sectional view of a preferred embodiment of a swivel insert as illustrated in FIG. 3. A preferred embodiment of the swivel insert includes three radially extending bores, 45, 47, and 49, equally distributed circumferentially around the swivel insert.

Figure 5:
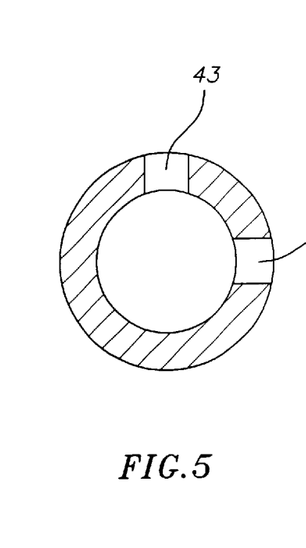
FIG. 5 is a cross-sectional view of a non-threaded portion of a swivel insert.

The non-threaded portion 44 includes at least one radially extending bore 46 for the introduction of a spanner wrench during assembly. FIG. 5 is a cross-sectional view through the non-threaded portion of the preferred embodiment of the swivel insert as illustrated in FIG. 3. Two radially extending bores, 43 and 46 are located in the non-threaded portion and located at substantially right angles with respect to each other.

Figure 6:
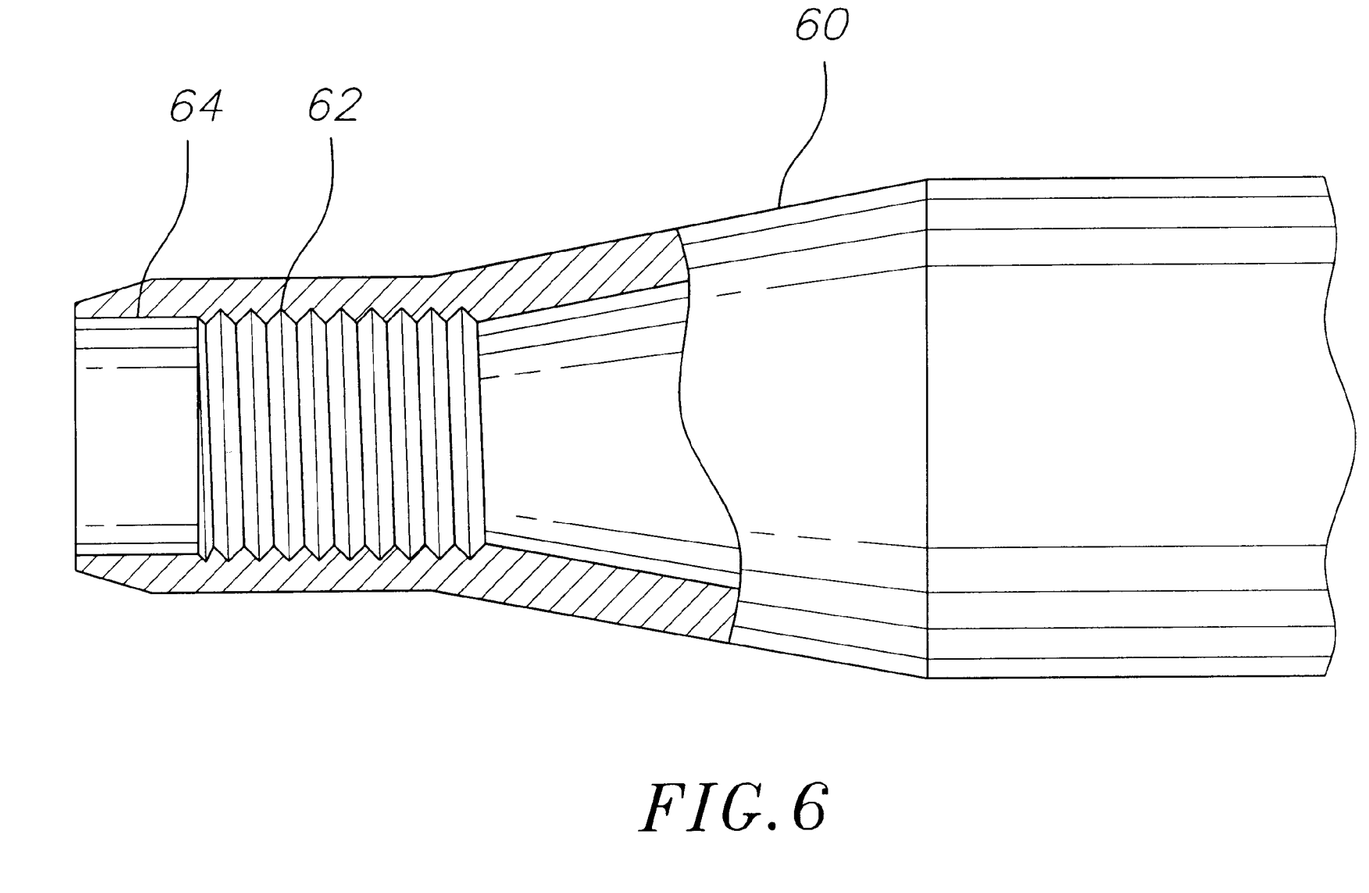
FIG. 6 is a side view of a rod end for insertion into a swivel insert.

FIG. 6 is a partial cutaway side view of a threaded tube prepared for use as a rod body of a control rod employing a swivel insert. Tube 60 is preferably composed of a softer material than screw threads 47 of threaded portion 42 of external surface 40 (all of FIG. 3) of a swivel insert. The tube has an internally threaded bore 62 for mating with the screw threads of the threaded portion of the swivel insert. A counter bored entrance portion 64 to the internally threaded bore has a diameter substantially equal to the major axis of the swivel insert's screw threads and thus the swivel insert's screw threads are readily threaded into the internally threaded bore without interference until the grooves 48 (FIG. 3) of the swivel insert are aligned with the entrance portion.

Figure 7:
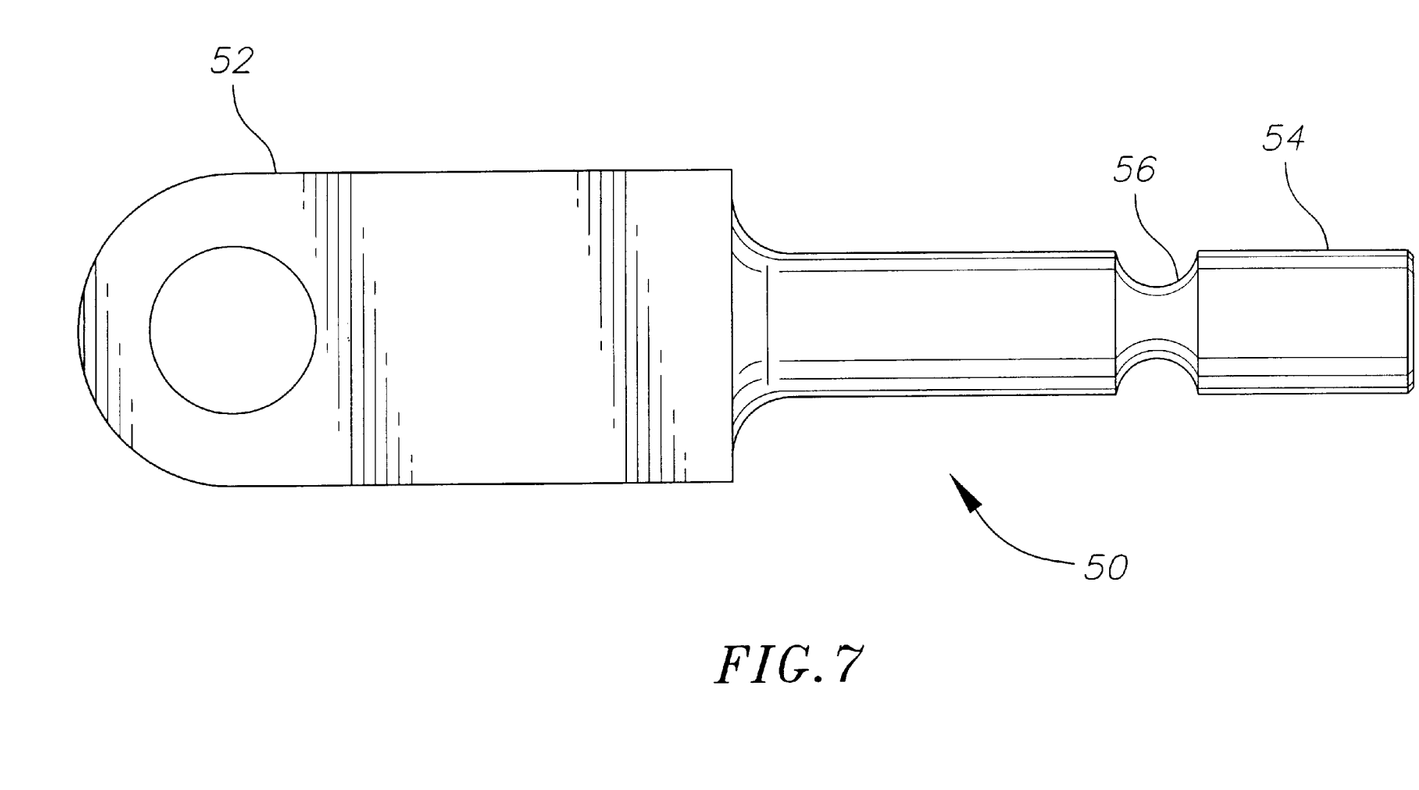
FIG. 7 is a partial cutaway view of a rod end shaft inserted into a swivel insert.

FIG. 7 is a side view of a rod end for insertion into longitudinal bore 39 (FIG. 3) of swivel insert 38 (FIG. 3). Rod end 50 is a connector to a push-pull load, such as an eye bolt, clevis, or the like. The rod end has a connection end 52 and a shaft 54. The shaft includes a circumferential groove 56 extending around the circumference of the shaft end.

Figure 8:
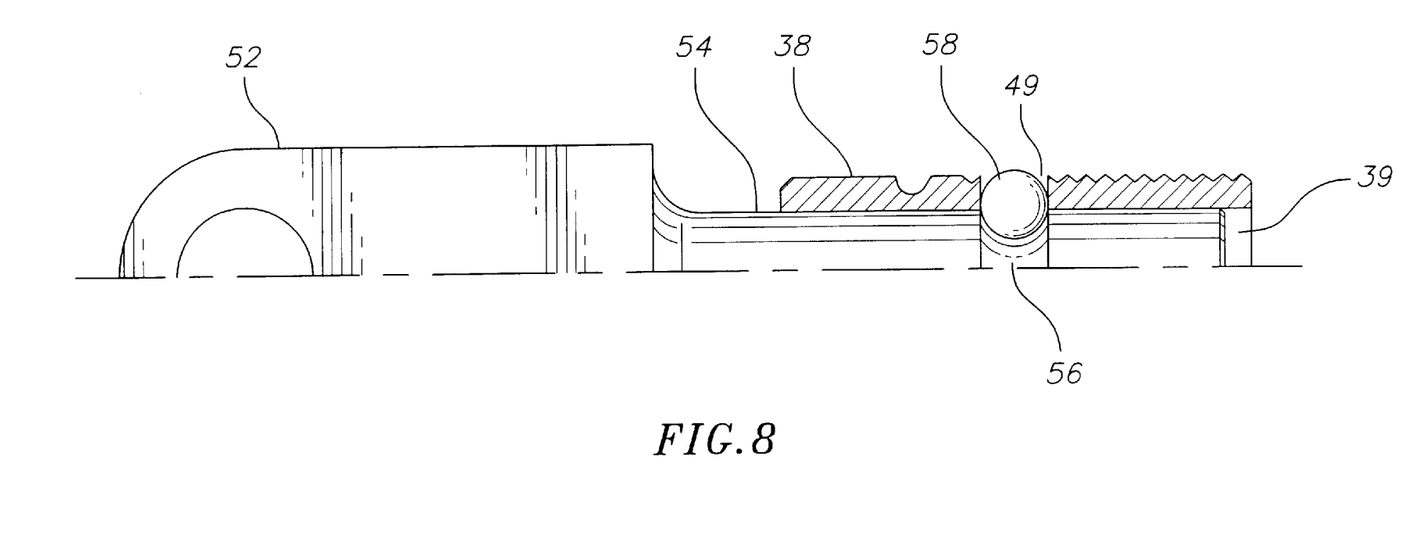
FIG. 8 is a partial cutaway side view of a threaded tube prepared for use as a rod body of a control rod employing a swivel insert.

FIG. 8 is a partial cutaway view of a rod end shaft inserted into a swivel insert. Shaft 54 extends along longitudinally extending bore 39 in swivel insert 38 with circumferential groove 56 in substantial alignment with radially extending bore 49. A precision ball bearing 58 substantially fills radially extending bore 49 of the swivel insert and rests in the circumferential groove of the shaft. The precision ball bearing, by filling radially extending bore 49 and resting in the circumferential groove, prevents the shaft from being displaced longitudinally with respect to the swivel insert but does not prevent the shaft from rotating freely with respect to the swivel insert.

Figure 9:
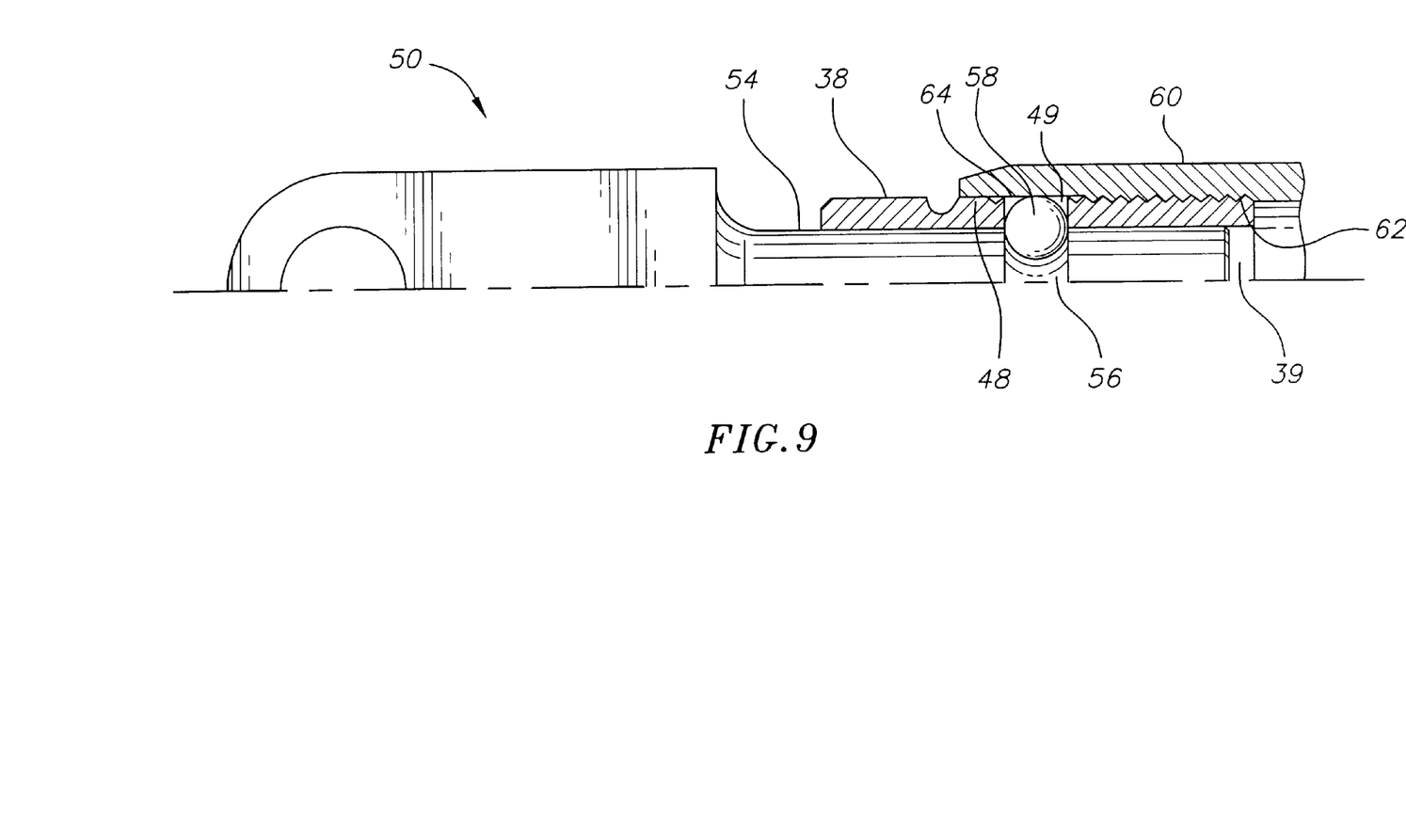
FIG. 9 is a partial cutaway view of a rod end mated to a tube using a swivel insert.

FIG. 9 is a partial cutaway view of a rod end mated to a tube using a swivel insert. Shaft 54 of rod end 50 is located in longitudinally extending bore 39 of swivel insert 38 such that circumferential groove 56 is substantially aligned with radially extending bore 49 of the swivel insert. The swivel insert is threaded into the internally threaded bore 62 of tube 60 such that the radially extending bore 49 of the swivel insert and longitudinally extending grooves 48 are within the entrance portion 64 of the tube. A ball bearing 58 substantially fills the radially extending bore 49 and is captured by the entrance portion of the tube and the circumferential groove of the rod end shaft.

Figure 10:
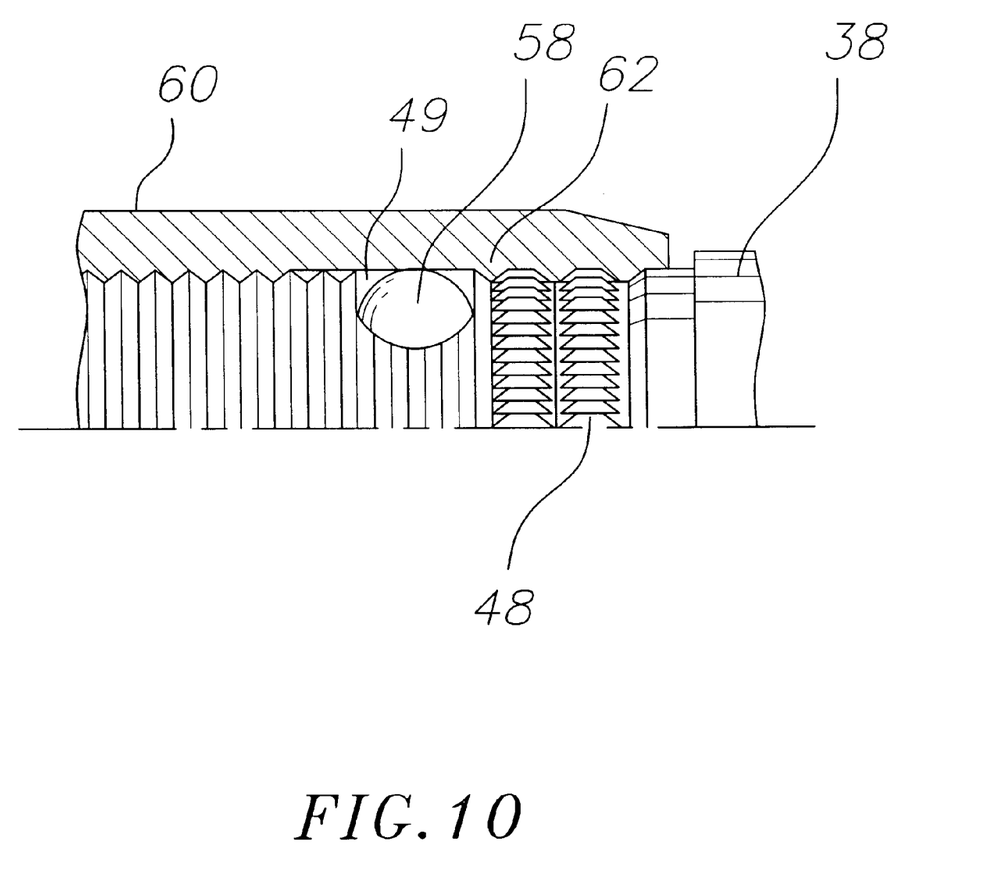
FIG. 10 is a cross-sectional view of a swaged connection of a control rod with a swivel insert.

"FIG. 10 is a partial cutaway view of a swaged connection created by applying a swaging force to the assembly of FIG. 9. Preferably contact of the swaging tool applying the swaging force to tube 60 is limited to the external area of the tube opposite entrance portion 62 aligned with longitudinally extending grooves 48 of swivel insert 38. With proper swaging, metal from the tube is caused to flow into the longitudinally extending grooves of the swivel insert. Preferably, the swaging force is not applied to the external area of the tube opposite the entrance portion aligned with ball bearing 58 captured in radially extending bore 49 thus leaving the ball bearing free to rotate."

Figure 11:
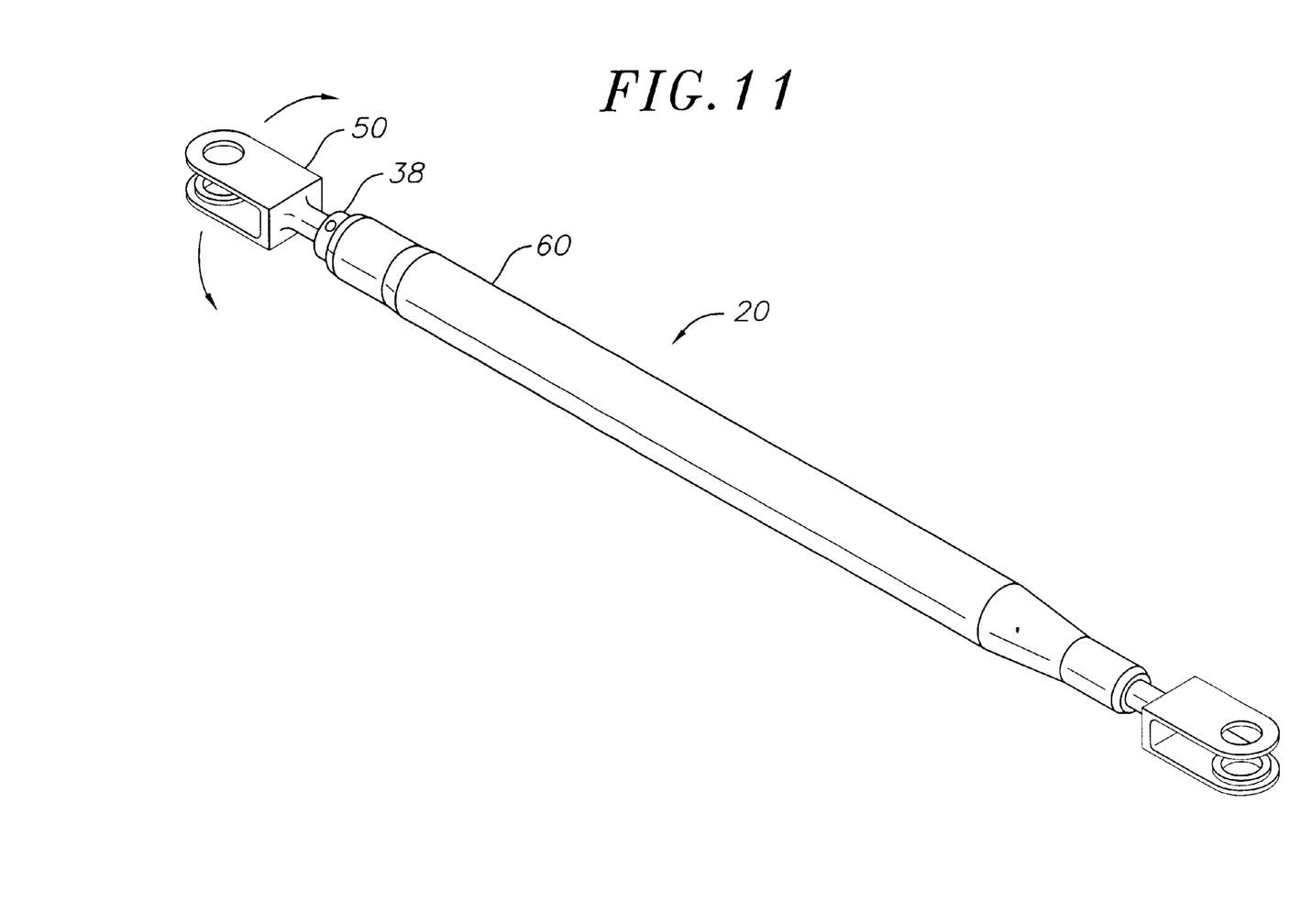
FIG. 11 is a perspective view of a control rod with a rotatably connected rod end according to the present invention.

FIG. 11 is a perspective view of a control rod incorporating a swivel insert according to the present invention. Control rod 20 comprises rod end 50 connected via swivel insert 38 to tube 60. The rod end is free to rotate with respect to the tube but the rod end is prevented from being separated from the control rod by a longitudinal force.

In an alternative embodiment of a tube 60 (FIG. 6), the entrance portion to the internally threaded bore has a diameter not greater than the major axis of the swivel insert's screw threads.

In an alternative embodiment of the tube, the entrance portion is counter bored to a depth of 0.350 inches.

Referring again to FIG. 7, in an alternative embodiment of the rod end 50 the connection end 52 of the rod end may terminate in a manner suitable for attachment to another element such as a threaded or socketed connector.

In another alternative embodiment of a rod end, the depth of the circumferential groove 56 of the rod end shaft 54 is about one half of the diameter of the ball bearing 58 (FIG. 9). This reduces the tendency of the ball bearing to be forced out of the circumferential groove 56 and press against the entrance portion 64 of the tube 60 as the rod end is subjected to longitudinal forces.

In another alternative embodiment of a rod end, the shaft 54 is coated with a solid film permanent lubricant such as specified in military specification MIL-L-0046010E entitled "LUBRICANT, SOLID FILM, HEAT CURED, CORROSION INHIBITING".

In an alternative embodiment of the swivel insert, the radially extending bore in the threaded portion of the swivel insert has a diameter sufficiently large so as to allow the ball bearing to rotate freely. In this embodiment, the entrance portion of the tube aligned with the ball bearing acts as an outer race for the ball bearing and the circumferential groove of the rod end shaft acts as an inner race.

In another alternative embodiment of the swivel insert, the swivel insert is threaded into the tube with an adhesive sealer coating the threads. An angle swaging operation is performed over the non-threaded portion of the swivel insert, creating a swaged connection. Alternatively, an overlap swaging operation is performed over the threaded portion of the connection, creating a swaged connection.

In another alternative embodiment of the swivel insert and the tube, the tube is not composed of a material relatively softer than the swivel insert. In this embodiment, the swivel insert is threaded into the tube with an adhesive sealer coating the threads.

In another alternative embodiment of the swivel insert, the longitudinally extending bore terminates within the swivel insert and at a single opening at the end of the non-threaded portion.

In another alternative embodiment of a swivel insert, the screw thread is a 0.500-28 UNJEF-3A thread.

In another alternative embodiment of the swivel insert, the radially extending bore is not located within the threaded portion.

In another alternative embodiment of the swivel insert, the swivel insert does not include a non-threaded portion.

In another alternative embodiment of a swivel insert, the diameter of the radially extending bore is between 0.189 and 0.188 inches and the radius of the circumferential groove on the shaft of the rod end is between 0.096 and 0.094 inches.

Although the present invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the claims supported by this application and their equivalents rather than the foregoing description.

What is claimed is:

1. A control rod for an aircraft actuator system, comprising:

a swivel insert including a tubular member having a longitudinally extending bore, external screw threads, and at least one radially extending bore through the tubular member;

a rod end including a shaft, the shaft including a circumferential groove;

at least one ball bearing; and a tube including an internally threaded bore, the tube adapted to be connected to the swivel insert;

wherein the shaft is located in the longitudinally extending bore, the radially extending bore and circumferential groove substantially aligned;

wherein the tube is threadably coupled to the swivel insert, the ball bearing captured substantially within the radially extending bore between the circumferential groove and the tube;

wherein the swivel insert further includes a plurality of longitudinally extending grooves, the tube located in the longitudinally extending grooves to prevent rotation between the swivel insert and the tube.

2. The control rod for an aircraft actuator system of claim 1, wherein a depth of the circumferential groove is about one half of a diameter of the ball bearing to prevent the ball bearing from being forced out of the circumferential groove against the tube due to longitudinal forces acting on the rod end.

3. The control rod for an aircraft actuator system of claim 1, wherein:

the tube includes a counter bored entrance portion; and the ball bearing is captured substantially within the radially extending bore between the circumferential groove and the counter bored entrance portion of the tube.

4. The control rod for an aircraft actuator system of claim 1, wherein the tube is composed of a material relatively softer than that of the external screw threads.

5. A control rod for an aircraft actuator system, comprising:

a swivel insert including a tubular member having a longitudinally extending bore, external screw threads, and at least one radially extending bore through the tubular member;

a rod end including a shaft, the shaft including a circumferential groove;

at least one ball bearing; and a tube including an internally threaded bore, the tube adapted to be connected to the swivel insert;

wherein the shaft is located in the longitudinally extending bore, the radially extending bore and circumferential groove substantially aligned;

wherein the tube is threadably coupled to the swivel insert, the ball bearing captured substantially within the radially extending bore between the circumferential groove and the tube;

wherein the swivel insert further includes an external non-threaded portion, the external non-threaded portion including at least one radially extending bore for introduction of a spanner wrench.

6. A method of assembling a control rod for an aircraft actuator system, comprising:

providing a swivel insert including a tubular member having a longitudinally extending bore, external screw threads, at least one radially extending bore through the tubular member, and a plurality of longitudinally extending grooves;

providing a rod end including a shaft, the shaft including a circumferential groove;

inserting the shaft into the longitudinally extending bore until the circumferential groove is substantially aligned with the radially extending bore;

threading a tube having an internally threaded bore onto the external screw threads of the swivel insert;

capturing a ball bearing substantially within the radially extending bore between the circumferential groove and the tube;

swaging the tube onto the plurality of longitudinally extending grooves of the swivel insert such that the tube is located in the longitudinally extending grooves to prevent rotation between the swivel insert and the tube.

7. The method of assembling a control rod for an aircraft actuator system of claim 6, wherein a depth of the circumferential groove is about one half of a diameter of the ball bearing to prevent the ball bearing from being forced out of the circumferential groove against the tube due to longitudinal forces acting on the rod end.

8. The method of assembling a control rod for an aircraft actuator system of claim 6, further comprising:

creating a counter bored entrance portion in the tube; and substantially capturing the ball bearing within the radially extending bore between the circumferential groove and the counter bored entrance portion of the tube.

9. An actuator system for an aircraft, comprising:

an actuator;

an actuatable control surface of an aircraft;

a control rod having a first end and a second end, including:

a swivel insert including a tubular member having a longitudinally extending bore, external screw threads, and at least one radially extending bore through the tubular member;

a rod end including a shaft, the shaft including a circumferential groove;

at least one ball bearing; and a tube including an internally threaded bore, the tube adapted to be connected to the swivel insert;

wherein the shaft is located in the longitudinally extending bore, the radially extending bore and circumferential groove substantially aligned;

wherein the tube is threadably coupled to the swivel insert, the ball bearing captured substantially within the radially extending bore between the circumferential groove and the tube; and wherein the control rod is operably coupled at the first end to the actuator and operably coupled at the second end to the actuatable control surface.

10. The actuator system for an aircraft of claim 9, wherein a depth of the circumferential groove is about one half of a diameter of the ball bearing to prevent the ball bearing from being forced out of the circumferential groove against the tube due to longitudinal forces acting on the rod end.

11. The actuator system for an aircraft of claim 10, wherein:

the tube includes a counter bored entrance portion; and the ball bearing is captured substantially within the radially extending bore between the circumferential groove and the counter bored entrance portion of the tube.

12. The actuator system for an aircraft of claim 11, wherein the swivel insert further includes an external non-threaded portion, the external non-threaded portion including at least one radially extending bore for introduction of a spanner wrench.

\* \* \* \* \*